US010564854B2

(12) United States Patent
Skjolsvold et al.

(10) Patent No.: US 10,564,854 B2
(45) Date of Patent: Feb. 18, 2020

(54) TRACKING INTERNAL LATENCIES FOR LOAD BALANCING OF FILE SERVER

(71) Applicant: Microsoft Technology Licensing, LLC, Redmond, WA (US)

(72) Inventors: Arild E. Skjolsvold, Kenmore, WA (US); Xinhua Ji, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 109 days.

(21) Appl. No.: 15/485,161

(22) Filed: Apr. 11, 2017

(65) Prior Publication Data

US 2018/0292998 A1 Oct. 11, 2018

(51) Int. Cl.
*G06F 3/06* (2006.01)
*H04L 29/08* (2006.01)

(52) U.S. Cl.
CPC ............ *G06F 3/0611* (2013.01); *G06F 3/067* (2013.01); *G06F 3/0631* (2013.01); *G06F 3/0644* (2013.01); *H04L 67/1008* (2013.01); *H04L 67/1097* (2013.01)

(58) Field of Classification Search
CPC ...... G06F 3/0611; G06F 3/0644; G06F 3/067; G06F 3/0631
See application file for complete search history.

(56) References Cited

U.S. PATENT DOCUMENTS

| 7,797,393 | B2 * | 9/2010 | Qiu ........................ G06F 21/80 |
| | | | 709/212 |
| 8,949,677 | B1 | 2/2015 | Brundage et al. |
| 9,141,578 | B2 | 9/2015 | Mashtizadeh et al. |
| 9,467,505 | B2 | 10/2016 | Gulati et al. |
| 2003/0105797 | A1 * | 6/2003 | Dolev ..................... G06F 9/505 |
| | | | 718/105 |
| 2007/0150600 | A1 * | 6/2007 | Barsness ............. G06F 11/3447 |
| | | | 709/227 |
| 2010/0095013 | A1 * | 4/2010 | Zuckerman ......... H04L 67/1008 |
| | | | 709/231 |

(Continued)

OTHER PUBLICATIONS

Jo, Myung Hyun and Won Woo Ro, "Dynamic Load Balancing of Dispatch Scheduling for Solid State Disks," IEEE Transactions on Computers, Issue 99, Dec. 7, 2016, pp. 1-14.

(Continued)

*Primary Examiner* — Esther B. Henderson
(74) *Attorney, Agent, or Firm* — Shook, Hardy & Bacon LLP (57) ABSTRACT

A system for load-balancing partitions of file servers of a file storage service of a cloud computing system is provided. The system collects latency information relating to access requests to access storage that is partitioned. The access requests are processed by the file servers. Each file server is assigned partitions, which are indexes to the storage. For each file server, the system generates, from the latency information, partition statistics relating to partition latency associated with each partition assigned to that file server. For each partition, the system applies rules to the statistics to determine actions to take to mitigate performance problems. Each rule has a condition and an action. When the condition of the rule is satisfied based on the partition statistics for the partition, the system records an indication to take the action of the rule.

20 Claims, 7 Drawing Sheets

(56) References Cited

U.S. PATENT DOCUMENTS

| | | | |
|---|---|---|---|
| 2012/0290877 A1* | 11/2012 | Grube | G06F 11/0727 |
| | | | 714/15 |
| 2013/0204990 A1* | 8/2013 | Skjolsvold | G06F 9/5077 |
| | | | 709/223 |
| 2016/0055225 A1* | 2/2016 | Xu | G06F 17/30575 |
| | | | 707/624 |
| 2016/0261478 A1 | 9/2016 | Navasivasakthivelsamy et al. | |
| 2016/0357443 A1 | 12/2016 | Li et al. | |
| 2017/0010931 A1 | 1/2017 | Agarwal et al. | |

OTHER PUBLICATIONS

Chen, et al., "Outlier Detection for Fine-grained Load Balancing in Database Cluster," In Proceedings of IEEE 23rd International Conference on Data Engineering Workshop, Apr. 17, 2007, 10 pages.

Ahmad, et al., "Real-Time Anomaly Detection for Streaming Analytics," In Journal of Computing Research Repository, Jul. 8, 2016, 10 pages.

Suo, et al., "Time Capsule: Tracing Packet Latency across Different Layers in Virtualized Systems", In Proceedings of the 7th ACM SIGOPS Asia-Pacific Workshop on Systems, Aug. 4, 2016, pp. 1-9.

\* cited by examiner

TRACKING INTERNAL LATENCIES FOR LOAD BALANCING OF FILE SERVER

BACKGROUND

A cloud computing system (also referred to as a "cloud") has data centers with servers and storage devices that host the applications and data of tenants of the cloud. A tenant is an organization whose applications and data are hosted by the cloud. A cloud provides many services that can be used by the applications of the tenants. For example, a cloud may provide identity provider services, file storage services, database services, security services (e.g., anti-virus software and firewalls), load balancing services, and so on. The tenants subscribe to the services that are needed to support their applications.

The tenants of a cloud tend to store vast amounts of data in the cloud. The data can include audio and video data that is streamed to users, transactions of a tenant's customers that are stored in real time (such as electronic commerce transactions), the inventory of electronic commerce systems, the electronic mails of electronic mail systems, images of image file sharing web sites, web pages of web sites, and so on. A file storage service of a cloud manages the storage of the data for those tenants that subscribe to the file storage service. The file storage service may provide many sophisticated services to the applications. For example, the file storage service may provide an automated backup service so that if data stored on one storage device becomes unavailable (e.g., because it is corrupted or the storage device fails), a backup copy is available. Another service that may be provided is a remote duplication service that stores duplicates of data at multiple data centers so that if one data center fails (e.g., because of a natural disaster), a failover procedure will allow access requests (e.g., read requests and write requests) to be routed to a data center that has not failed.

A file storage service needs to securely store the data of each tenant (e.g., data can be accessed only by authorized users and applications) and to service access requests in a timely manner. To help with security, the file storage service may generate one or more partitions for each tenant (or application of a tenant) that serves as an index to the data of the tenant that is stored on file storage devices. When the file storage service receives an access request for a tenant, it directs the access request to a file server that is assigned a partition that indexes the data that is the target of the access request. The file storage service accesses the partition to identify the file storage devices that need to be accessed to service the access request. To help with the servicing of access requests in a timely manner, the file storage service may perform load balancing of the partitions. For example, if a large number of access requests are directed to one file server, the file storage service may assign a partition currently assigned to that file service to a different file server. The decision to reassign partitions is based primarily on various performance factors that indicate performance has been degraded. The performance factors may include whether a file server starts throttling access requests by responding to access requests indicating that the file server is too busy, whether the file server sends timeout responses indicating that the file server cannot handle the request in a timely manner, and so on. Although these performance factors provide some basis for reassigning partitions, the reassignments can occur only well after a performance problem is detected. It would be desirable to perform load balancing of the partitions before performance problems are encountered.

SUMMARY

A system for load-balancing partitions of file servers of a file storage service of a cloud computing system is provided. In some embodiments, the system collects latency information relating to access requests to access storage that is partitioned. The latency information may be considered internal to a file server in the sense that it is not derived from data that the file server normally would expose externally, such as throttling and timeout messages. The access requests are processed by the file servers. Each file server is assigned partitions, which are indexes to the storage. A file server handles all access requests to storage that are indexed by the partition assigned to the server. For each file server, the system generates, from the latency information, partition statistics relating to partition latency associated with each partition assigned to that file server. The system may also generate file server statistics relating to information of the file server that is not attributable to an individual partition. For each partition, the system applies rules to the statistics to determine actions to take to mitigate performance problems. Each rule has a condition and an action (e.g., how to adjust a partition). When the condition of the rule is satisfied based on the partition statistics for the partition and the file server statistics for the file server to which the partition is assigned, the system records an indication to take the action of the rule.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A method and system for performing load balancing for file servers based on internal latencies within the file servers is provided. In some embodiments, a file server load balancing ("FSLB") system is provided that collects internal latency information on internal components of a file server and determines whether to adjust the partitions of the file server based on the internal latencies. For example, the internal latency information may relate to the time each access request spends in various queues, the number of access requests in a queue, and so on. The queues may include different queue types such as a request queue, a partition queue, and so on. A request queue may initially store all access requests received by a file server. A partition queue may store access requests for a particular partition after being removed from the request queue. The FSLB system generates, from the latency information, queue statistics relating to latency associated with each queue of a file server. For example, the queue statistics may include the average time an access request (or more generally an entry) spent in a queue, the average length of a queue over various intervals (e.g., 15 seconds, one minute, and five minutes), and so on. The FSLB system may also generate queue type statistics relating to overall latency of queues of that queue type of a file server. For example, a queue type statistic may include the average time an access request spent in the queues of that type over a certain interval. Partition statistics are statistics that relate to a particular partition, such as the queue statistics derived from latency information for a certain partition queue. File server statistics are statistics that are not related to an individual partition, such as the queue statistics derived from the request queue, the queue type statistics, and so on. The FSLB system may employ more generally queue information that includes latency information for a queue, the size of read and write requests of queue entries, the number of threads allocated to a queue, and so on.

In some embodiments, the FSLB system performs the load balancing of partitions of the file servers based on the queue statistics and the queue type statistics. The FSLB system maintains a rule store that stores rules to apply to the statistics to determine whether a partition is to be adjusted. An administrator of a cloud may define and subsequently refine the rules based on analysis of access request patterns of tenants of the cloud. A rule may include a condition and an action. A condition specifies a criterion for taking the associated action. For example, a criterion may specify that the file server has an average response time for access requests that is greater than a certain threshold and that a partition queue has an average time in queue for access requests that is more than double the average time for all queues of that queue type. Such a condition may be considered to specify an outlier criterion because it defines a partition whose statistics may indicate a performance problem given that the statistics are significantly different from those of other partitions of the same file server. The action may specify to assign (or move) the partition to another file server. So when the rule is applied and the condition is satisfied by a partition of a file server, the FSLB system designates that partition to be assigned to a different file server. The FSLB system may apply the rules to a file server at various times, such as periodically (e.g., every five minutes), when the average time in queue for a certain queue type exceeds a threshold, and so on. In this way, the FSLB system can load-balance the partitions among the file servers based on the internal latencies of queues within each file server. With such load balancing, a file storage service can help avoid potential problems resulting from the access patterns to the partitions so that throttling and timing out of access requests can be reduced. Moreover, the FSLB system can load-balance the partitions among the file servers when throttling and timing out information is not available.

Figure 1:
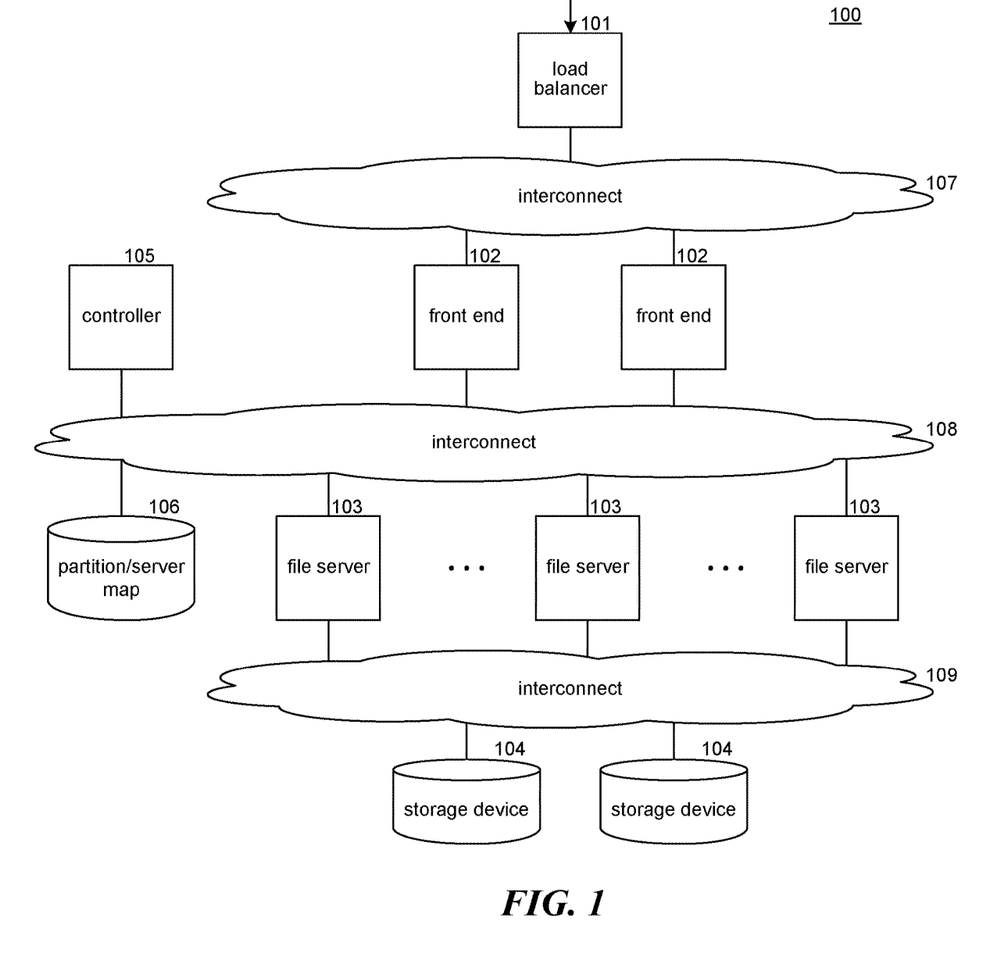
FIG. 1 is a block diagram illustrating components of a file storage service in some embodiments.

FIG. 1 is a block diagram illustrating components of a file storage service in some embodiments. A file storage service 100 of a cloud includes a load balancer 101, front ends 102, file servers 103, and storage devices 104. The load balancer is connected to the front ends via a network interconnect 107. The load balancer receives access requests from applications of various tenants of the cloud and distributes the access requests to the various front ends to balance the load among the front ends. The front ends are connected to the file servers via a network interconnect 108. A controller 105 and a partition/server map store 106 are also connected to the network interconnect 108. The controller hosts the primary functionality of the FSLB system in that it applies the rules and coordinates the adjusting of the partitions based on actions recorded when the rules are applied. When a front end receives an access request, it checks the partition/server map to identify the file server that is assigned the partition specified by the access request. The front end then sends the access request to the identified file server. Each front end may store a local copy of the partition/server map in its memory to avoid the overhead of accessing a local store or the partition/server map store. The file servers are connected to the storage devices via a network interconnect 109. When a file server receives an access request, it accesses the partition for the access request to identify the storage device(s) to be accessed to fulfill the access request. The file servers may store the partitions in memory to speed up processing. Although shown as separate network interconnects, network interconnects 107-109 may be part of the same network interconnect.

Figure 2:
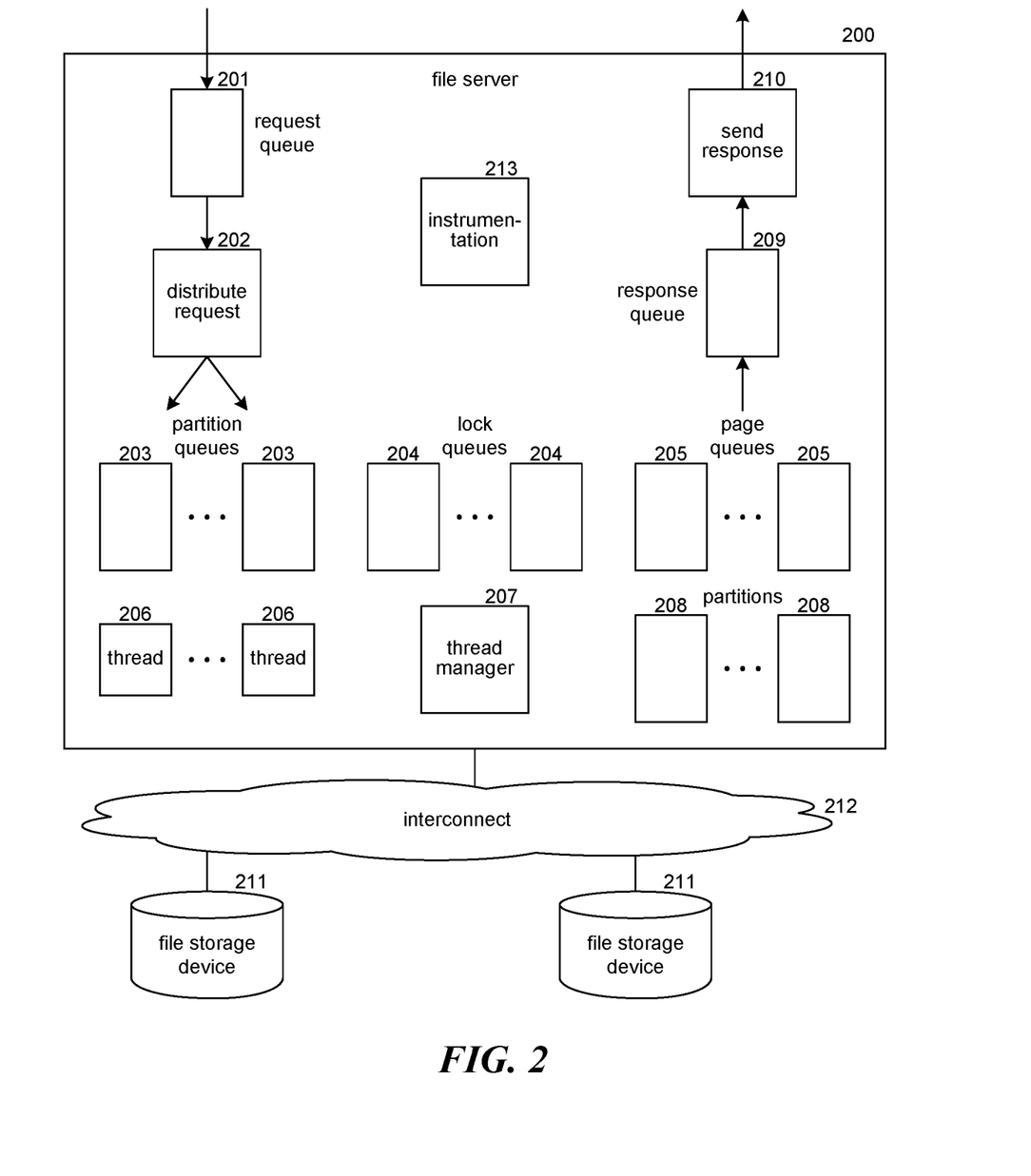
FIG. 2 is a block diagram illustrating components of a file server in some embodiments.

FIG. 2 is a block diagram illustrating components of a file server in some embodiments. A file server 200 is connected to file storage devices 211 via a network interconnect 212. The file server includes a request queue 201 and a distribute request component 202. When an access request is received from a requesting application, the file server stores the access request in the request queue. The distribute request component distributes the access requests to partition queues 203. Each partition 208 is an index for the file storage of the file storage devices that are allocated for a tenant. Each partition has its own partition queue. Each partition queue may also have one or more corresponding threads 206 that remove access requests from the partition queue and interact with the file storage devices to fulfill the access requests. A thread manager 207 may coordinate the creation and scheduling of threads to handle the access requests. When an access request has been fulfilled by a thread, the thread may add a response message to a response queue 209. A send response component 210 removes response messages from the response queue and sends the response messages to the requesting application. The file server may also include various other queues such as lock queues 204 and page queues 205. When multiple threads are handling access requests for the same partition, the threads may need to lock portions of the partition to prevent synchronization problems. For each lock, the file server may maintain a lock queue for the access requests that are waiting for the lock to be removed. A partition may be associated with multiple lock queues corresponding to the locking of different portions of a partition. When data is to be written to or read from a file storage device, pages of memory need to be allocated for the access request. The file server may employ various page queues to queue requests for the allocation of pages. The FSLB system may use the latency information for the lock queues and page queues to generate lock queue statistics and page queue statistics as factors in the conditions of rules.

The FSLB system instruments the various queues to collect the latency information associated with the queues. The file server may include an instrumentation component 213 that collects the latency information and provides latency information to the controller. Although not illustrated, the code that adds an entry to a queue may be instrumented to record information about that entry along with the time at which the entry was added to the queue. Similarly, code that removes an entry from a queue records information about the entry along with the time at which the entry was removed from the queue. Although illustrated primarily as tracking latencies associated with the various queues, the FSLB system may use information about other possible causes of latency within the file server as factors in the conditions of rules. For example, the file server may be instrumented to record CPU utilization, memory utilization, number of threads, and so on.

The computing systems, also referred to as computer systems, used by the FSLB system may include a central processing unit, input devices, output devices (e.g., display devices and speakers), storage devices (e.g., memory and disk drives), network interfaces, graphics processing units, accelerometers, cellular radio link interfaces, global positioning system devices, and so on. A computing system may include multiple devices such as servers of a data center, massively parallel systems, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on them or may be encoded with computer-executable instructions or logic that implements the FSLB system. The data transmission media are used for transmitting data via transitory, propagating signals or carrier waves (e.g., electromagnetism) via a wired or wireless connection.

The FSLB system may be described in the general context of computer-executable instructions, such as program modules and components, executed by one or more computers, processors, or other devices. Generally, program modules or components include routines, programs, objects, data structures, and so on that perform tasks or implement data types. Typically, the functionality of the program modules may be combined or distributed as desired in various embodiments. Aspects of the FSLB system may be implemented in hardware using, for example, an application-specific integrated circuit (ASIC).

In some embodiments, the FSLB system may employ machine learning techniques to assist in identifying or to automatically identify conditions for the rules. For example, during a training phase, the FSLB system may generate at intervals various statistics for a file server along with indications of the performance of the file server during that interval. The indications of performance may be whether throttling or timing out has occurred. The FSLB system may generate feature vectors comprising the statistics and label each feature vector based on whether the feature vector represents a performance problem or not. A feature vector may contain features, for example, based on the average time in queue for each queue, the average time in queue for each queue type, and so on. A classifier may then be trained to identify features and values that are indicative of a performance problem that is about to occur. For example, the FSLB system may use training data to train a neural network or a support vector machine. Alternatively, the feature vectors can be labeled with an action to be taken such as no action, splitting a partition, splitting and reassigning one of the resulting partitions, reassigning a partition, and so on. The classifier then can be used to identify the action to take without use of rules by inputting a feature vector for the current interval and outputting an action.

Figure 3:
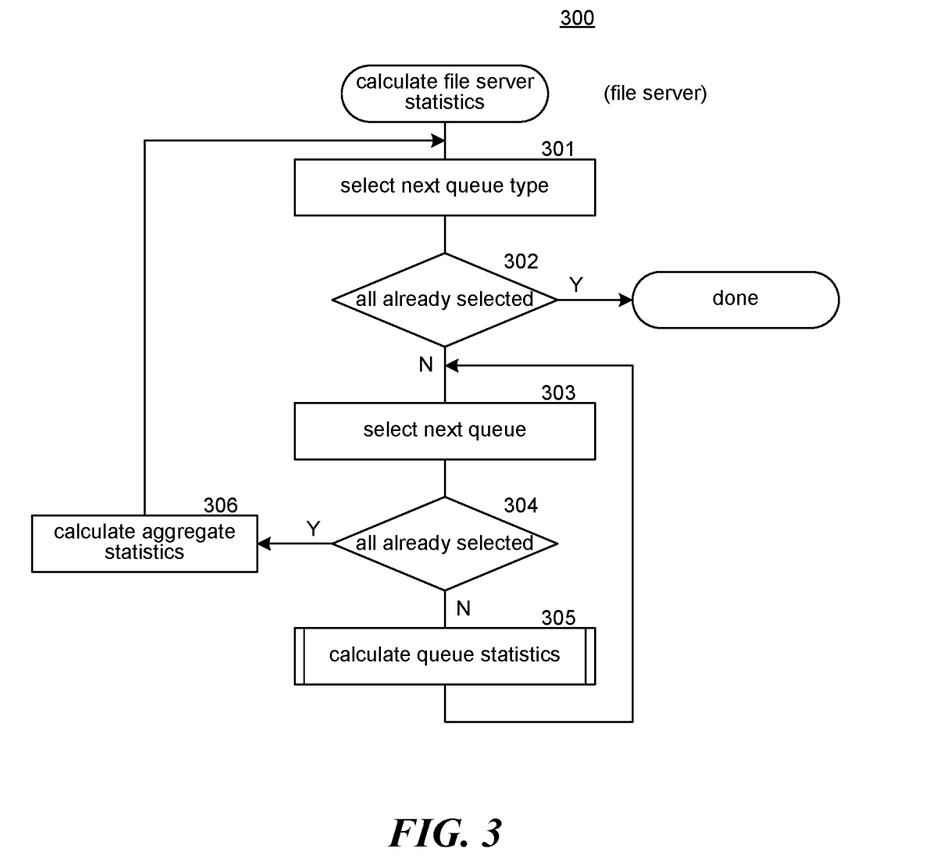
FIG. 3 is a flow diagram that illustrates the processing of a calculate file server statistics component in some embodiments.

FIG. 3 is a flow diagram that illustrates the processing of a calculate file server statistics component in some embodiments. A calculate file server statistics component 300 is passed an indication of a file server and generates statistics for that file server. In block 301, the component selects the next queue type. In decision block 302, if all the queue types have already been selected, then the component completes, else the component continues at block 303. In blocks 303-305, the component loops processing each queue of the selected queue type. In block 303, the component selects the next queue of the selected queue type. In decision block 304, if all such queues have already been selected, then the component continues at block 306, else the component continues at block 305. In block 305, the component invokes a calculate queue statistics component passing an indication of the selected queue to calculate the statistics for that queue. The component then loops to block 303 to select the next queue. In block 306, the component calculates various aggregate statistics for that queue type. For example, an aggregate statistic may be the average time overall that an entry is in a queue of the queue type, the total size of read and write requests, and so on. The component then loops to block 301 to select the next queue type.

Figure 4:
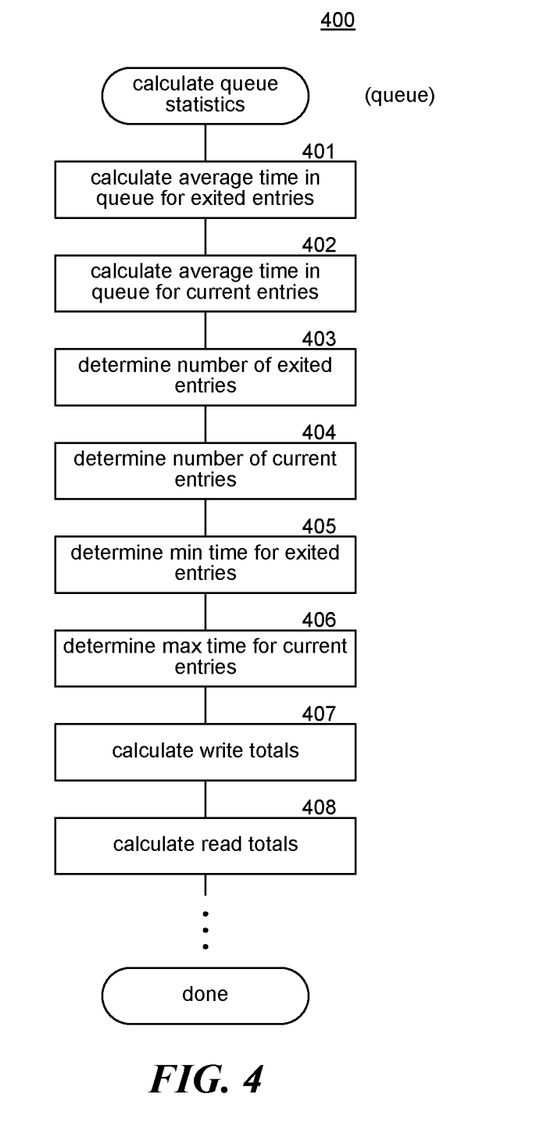
FIG. 4 is a flow diagram that illustrates the processing of a calculate queue statistics component in some embodiments.

FIG. 4 is a flow diagram that illustrates the processing of a calculate queue statistics component in some embodiments. A calculate queue statistics component 400 is passed an indication of a queue and calculates various statistics for that queue based on the latency information collected via the instrumentation. The component may perform the processing of blocks 401-408 for various intervals. In block 401, the component calculates the average time in the queue for those entries that exited the queue during the interval. In block 402, the component calculates the average time in the queue for those entries that are currently in the queue. In block 403, the component determines the number of entries that have exited the queue during the interval. In block 404, the component determines the number of entries that are currently in the queue. In block 405, the component determines the minimum time in the queue for an entry that exited the queue during the interval. In block 406, the component determines the maximum time in the queue for an entry that is currently in the queue. In block 407, the component calculates the total number of bytes to be written by the access requests in the queue. In block 408, the component calculates the total number of bytes to be read by the access requests in the queue. The component may also calculate various other queue statistics, and then it completes.

Figure 5:
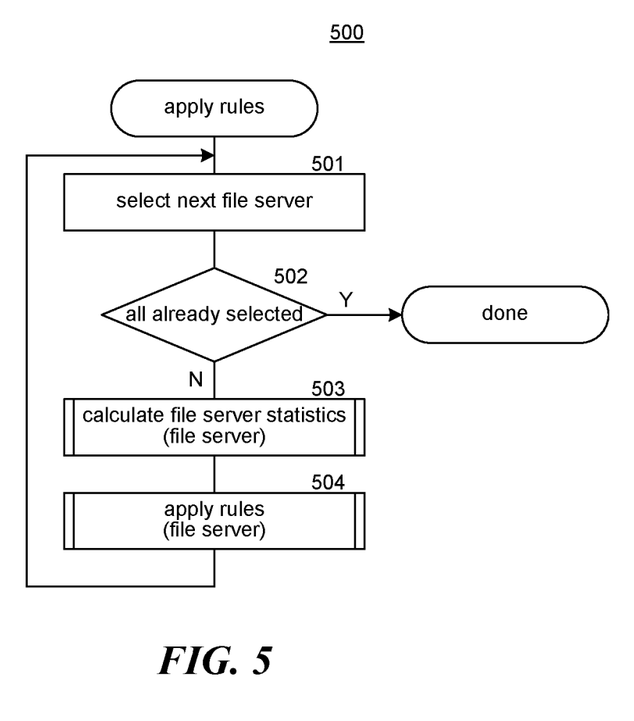
FIG. 5 is a flow diagram that illustrates the processing of an apply rules component for the file servers in some embodiments.

FIG. 5 is a flow diagram that illustrates the processing of an apply rules component for the file servers in some embodiments. An apply rules component 500 is invoked to apply rules for each file server to determine what actions should be taken. In block 501, the component selects the next file server. In decision block 502, if all the file servers have already been selected, then the component completes, else the component continues at block 503. In block 503, the component invokes the calculate file server statistics component to calculate statistics for the selected file server. In block 504, the component invokes an apply rules component passing an indication of the selected file server to apply the rules to the selected file server. The component then loops to block 501 to select the next file server.

Figure 6:
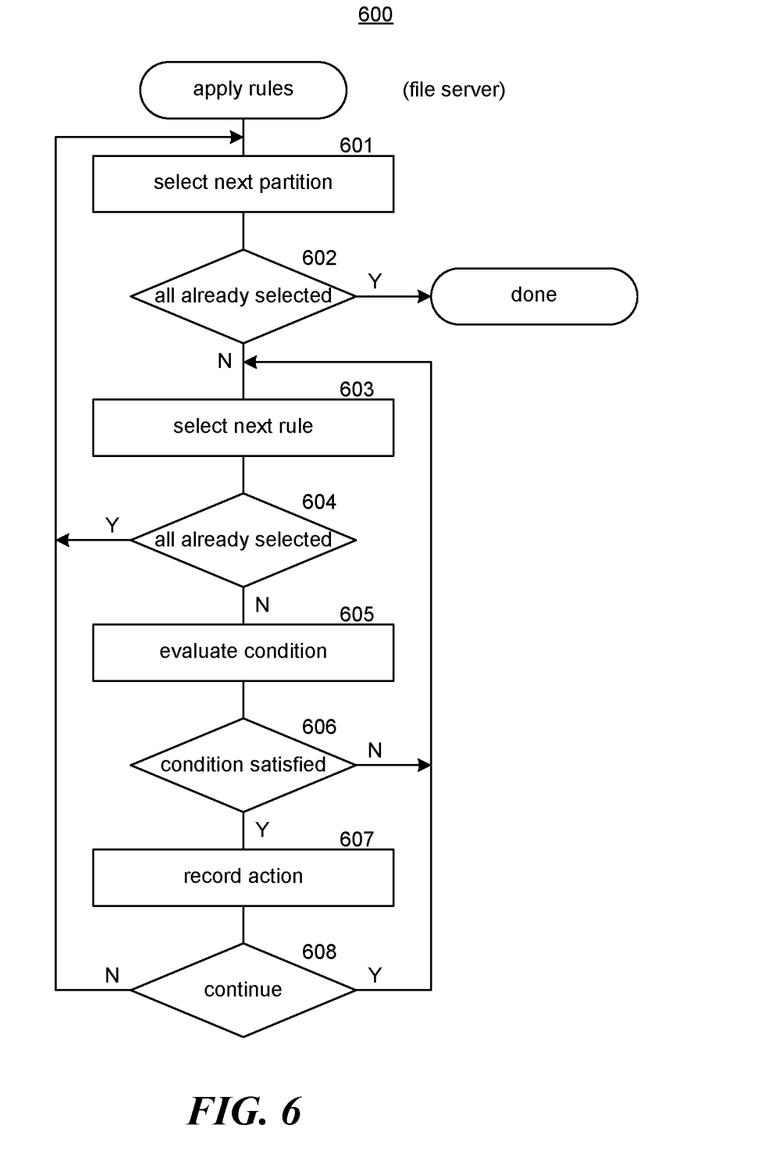
FIG. 6 is a flow diagram that illustrates the processing of an apply rules component for a file server in some embodiments.

FIG. 6 is a flow diagram that illustrates the processing of an apply rules component for a file server in some embodiments. An apply rules component 600 is passed an indication of a file server and applies the rules to the partitions of that file server. In block 601, the component selects the next partition assigned to the file server. In decision block 602, if all the partitions have already been selected, then the component completes, else the component continues at block 603. In blocks 603-608, the component loops applying each rule to the selected partition. In block 603, the component selects the next rule. In decision block 604, if all the rules have already been selected, then the component loops to block 601 to select the next partition, else the component continues at block 605. In block 605, the component evaluates the condition of the selected rule. In decision block 606, if the condition is satisfied, then the component continues at block 607, else the component loops to block 603 to select the next rule. In block 607, the component records the action associated with the selected rule. In decision block 608, if the rule indicates to continue applying rules for the selected partition, then the component loops to block 603 to select the next rule, else the component loops to block 601 to select the next partition.

Figure 7:
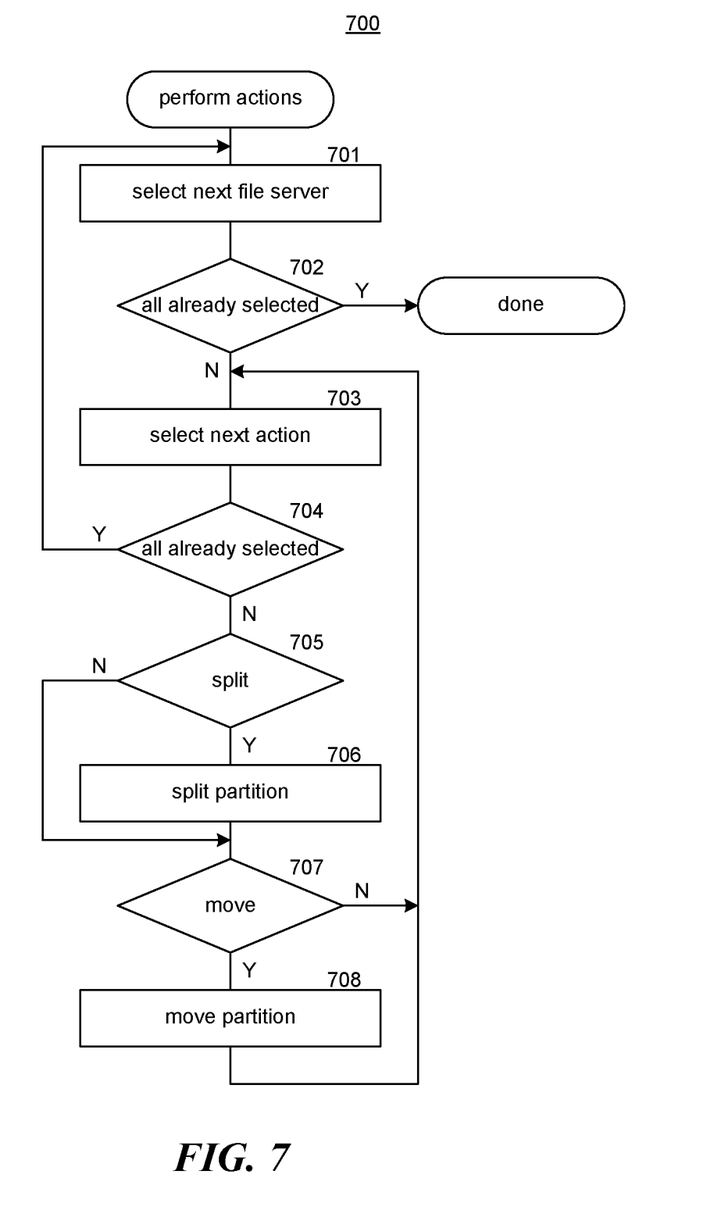
FIG. 7 is a flow diagram that illustrates the processing of a perform actions component in some embodiments.

FIG. 7 is a flow diagram that illustrates the processing of a perform actions component in some embodiments. A perform actions component 700 is invoked to perform the actions that were recorded when the rules were applied. In block 701, the component selects the next file server. In block 702, if all the file servers have already been selected, then the performing of the actions is complete and the component completes, else the component continues at block 703. In block 703, the component selects the next action recorded for the selected file server. In block 704, if all such actions have already been selected, then the component loops to block 701 to select the next file server, else the component continues at block 705. In decision block 705, if the action is to split a partition, then the component continues at block 706, else the component continues at block 707. In block 706, the component splits the partition designated by the action. In decision block 707, if the action indicates to move or reassign a partition or a partition resulting from a split, then the component continues at block 708, else the component loops to block 703 to select the next action. In block 708, the component moves or reassigns the partition and then loops to block 703 to select the next action.

The following paragraphs describe various embodiments of aspects of the FSLB system. An implementation of the FSLB system may employ any combination of the embodiments. The processing described below may be performed by a computing device with a processor that executes computer-executable instructions stored on a computer-readable storage medium that implements the FSLB system.

A method performed by a computing system is provided. The method collects latency information relating to access requests to access storage that is partitioned. The access requests are processed by file servers Each file server is assigned partitions, which are indexes to the storage. For each file server, the method generates, from the latency information, partition statistics relating to partition latency associated with each partition assigned to that file server and file server statistics relating to information of the file server that is not attributable to an individual partition. For at least some of the partitions and for each of a plurality of rules, which have conditions and actions, the method determines whether the condition of the rule is satisfied based on the partition statistics for the partition and the file server statistics for the file server to which the partition is assigned. When the condition is satisfied, the method records an indication to take the action of the rule, the action relating to modifying the partition. In some embodiments, an action is to split the partition. In some embodiments, an action is to reassign a partition to a different file server. In some embodiments, the reassigning of a partition includes moving the partition so that it is stored at a different file server. In some embodiments, each file server includes a request queue and, for each partition, a partition queue and wherein the latency information relates to queueing of the access requests in the request queue and the partition queues. In some embodiments, the partition statistics for a partition include a moving average of time spent by access requests in the partition queue for a partition over various intervals. In some embodiments, a condition of a rule for a partition is satisfied when a partition statistic for the partition satisfies an outlier criterion based on that partition statistic for other partitions assigned to the same file server. In some embodiments, each file server includes lock queues for locks to synchronize access to storage indexed by the partitions assigned to the file server, each lock queue associated with a partition, and the latency information relates to queueing in the lock queues. In some embodiments, each file server includes page queues for pages of memory for allocation of pages to access requests, and a file server statistic relates to queueing in the page queues.

In some embodiments, a computing system comprising one or more computer-readable storage media storing computer-executable instructions and one or more processors for executing the computer-executable instructions stored in the one or more computer-executable storage media. The instructions, when executed, control the computing system to access queueing information relating to partition queues of a file server. Each partition queue is for queueing access requests for a partition. Each file server is assigned one or more partitions, which are indexes to the storage. The instructions, when executed, control the computing system to generate, from the queueing information, partition statistics relating to access requests queued by each partition queue of the file server. The instructions, when executed, control the computing system to apply a plurality of rules for a partition by determining whether a condition of a rule is satisfied based on the partition statistics for the partition, and when the condition is satisfied, recording an action of the rule to take relating to the partition. In some embodiments, the instructions further control the computing system to generate, from the queueing information, file server statistics based on the queueing information of the partition queues of the file server. In some embodiments, a condition of a rule for a partition is satisfied when a partition statistic for the partition satisfies an outlier criterion based on that partition statistic for other partitions assigned to the same file server. In some embodiments, the instructions further control the computing system to access queueing information relating to lock queues for locks to synchronize access to storage indexed by the partitions assigned to a file server. Each lock queue is associated with a partition. In some embodiments, the partition statistics for a partition include a moving average of time spent by access requests in the partition queue for a partition over various intervals. In some embodiments, the action of a rule indicates to split a partition and assign at least one resulting partition to a different file server. In some embodiments, the instructions further control the computing system to perform the recorded actions.

In some embodiments, a method performed by a computing system to allocate partitions for storage is provided. The storage is accessible by file servers. Each partition is an index for the storage and is assigned to a file server. The method collects queueing information of partition queues, each partition having a partition queue for queueing access requests to access storage indexed by that partition. For each file server, the method generates, from the queueing information, partition statistics relating to partition queue latency associated with each partition queue assigned to that file server and overall partition statistics relating to the overall partition queue latency of the partition queues of that file server. For each of a plurality of partitions, the method applies a plurality of rules to determine whether a condition of a rule is satisfied based on the partition statistics for the partition and the overall partition statistics for the other partitions assigned to the same file server, and when the condition is satisfied, the method records an action of the rule to take relating to the partition. In some embodiments, a condition of a rule for a partition is satisfied when a partition statistic for the partition satisfies an outlier criterion based on that partition statistic for other partitions assigned to the same file server. In some embodiments, the method further includes comprising collecting queueing information relating to lock queues for locks to synchronize access to storage indexed by the partitions assigned to a file server. Each lock queue is associated with a partition. In some embodiments, the action of a rule indicates to assign a partition to a different file server or split a partition and then assign at least one of the resulting partitions to a different file server.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

The invention claimed is:

1. A method performed by a computing system, the method comprising:
   collecting latency information relating to access requests to access storage that is partitioned, the access requests being processed by file servers, each file server assigned partitions, which are indexes to the storage;
   for each file server, generating, from the latency information, partition statistics relating to partition latency associated with each partition assigned to that file server and file server statistics relating to information of the file server that is not attributable to an individual partition; and
   for at least some of the partitions,
   for each of a plurality of rules, which have conditions and actions, determining whether the condition of the rule is satisfied based on the partition statistics for the partition and the file server statistics for the file server to which the partition is assigned;
   and
   when the condition is satisfied, recording an indication to take the action of the rule, the action relating to modifying the partition.

2. The method of claim 1 wherein an action is to split the partition.

3. The method of claim 1 wherein an action is to reassign a partition to a different file server.

4. The method of claim 3 wherein the reassigning of a partition includes moving the partition so that it is stored at a different file server.

5. The method of claim 1 wherein each file server includes a request queue and, for each partition, a partition queue and wherein the latency information relates to queueing of the access requests in the request queue and the partition queues.

6. The method of claim 5 wherein the partition statistics for a partition include a moving average of time spent by access requests in the partition queue for a partition over various intervals.

7. The method of claim 5 wherein a condition of a rule for a partition is satisfied when a partition statistic for the partition satisfies an outlier criterion based on that partition statistic for other partitions assigned to the same file server.

8. The method of claim 1 wherein each file server includes lock queues for locks to synchronize access to storage indexed by the partitions assigned to the file server, each lock queue associated with a partition, and wherein the latency information relates to queueing in the lock queues.

9. The method of claim 1 wherein each file server includes page queues for pages of memory for allocation of pages to access requests and wherein a file server statistic relates to queueing in the page queues.

10. A computing system comprising:
    one or more computer-readable storage media storing computer-executable instructions that, when executed, control the computing system to:
    access queueing information relating to partition queues of a file server,
    each partition queue for queueing access requests for a partition,
    each file server assigned one or more partitions, which are indexes to the storage;
    generate, from the queueing information, partition statistics relating to access requests queued by each partition queue of the file server;
    and
    apply a plurality of rules for a partition by determining whether a condition of a rule is satisfied based on the partition statistics for the partition, and when the condition is satisfied, recording an action of the rule to take relating to the partition; and
    one or more processors for executing the computer-executable instructions stored in the one or more computer-executable storage media.

11. The computing system of claim 10 wherein the instructions further control the computing system to generate, from the queueing information, file server statistics based on the queueing information of the partition queues of the file server.

12. The computing system of claim 11 wherein a condition of a rule for a partition is satisfied when a partition statistic for the partition satisfies an outlier criterion based on that partition statistic for other partitions assigned to the same file server.

13. The computing system of claim 10 wherein the instructions further control the computing system to access queueing information relating to lock queues for locks to synchronize access to storage indexed by the partitions assigned to a file server, each lock queue associated with a partition.

14. The computing system of claim 10 wherein the partition statistics for a partition include a moving average of time spent by access requests in the partition queue for a partition over various intervals.

15. The computing system of claim 10 wherein the action of a rule indicates to split a partition and assign at least one resulting partition to a different file server.

16. The computing system of claim 10 wherein the instructions further control the computing system to perform the recorded actions.

17. A method performed by a computing system to allocate partitions for storage, the storage being accessible by file servers, each partition being an index for the storage and assigned to a file server, the method comprising:

collecting queueing information of partition queues, each partition having a partition queue for queueing access requests to access storage indexed by that partition;

for each file server, generating, from the queueing information, partition statistics relating to partition queue latency associated with each partition queue assigned to that file server and overall partition statistics relating to the overall partition queue latency of the partition queues of that file server; and     for each of a plurality of partitions, applying a plurality of rules to determine whether a condition of a rule is satisfied based on the partition statistics for the partition and the overall partition statistics for the other partitions assigned to the same file server, and when the condition is satisfied,     recording an action of the rule to take relating to the partition.

18. The method of claim 17 wherein a condition of a rule for a partition is satisfied when a partition statistic for the partition satisfies an outlier criterion based on that partition statistic for other partitions assigned to the same file server.

19. The method of claim 17 further comprising collecting queueing information relating to lock queues for locks to synchronize access to storage indexed by the partitions assigned to a file server, each lock queue associated with a partition.

20. The method of claim 17 wherein the action of a rule indicates to assign a partition to a different file server or split a partition and then assign at least one of the resulting partitions to a different file server.

* * * * *